US012009730B2

(12) United States Patent
Heald

(10) Patent No.: US 12,009,730 B2
(45) Date of Patent: Jun. 11, 2024

(54) MOBILE DIVERSIFIED POWER GENERATION SYSTEM UTILIZING GAS

(71) Applicant: BGH Design, LLC, Camden, ME (US)

(72) Inventor: Barry G. Heald, Camden, ME (US)

(73) Assignee: BGH Designs, LLC, Peyton, CO (US)

( * ) Notice: Subject to any disclaimer, the term of this patent is extended or adjusted under 35 U.S.C. 154(b) by 13 days.

(21) Appl. No.: 17/975,222

(22) Filed: Oct. 27, 2022

(65) Prior Publication Data

US 2024/0146151 A1    May 2, 2024

(51) Int. Cl.
*H02K 7/00*      (2006.01)
*H02K 7/18*      (2006.01)

(52) U.S. Cl.
CPC ................... *H02K 7/1823* (2013.01)

(58) Field of Classification Search
CPC .......... H02K 7/1823; H02K 11/30; B60P 3/00
See application file for complete search history.

(56) References Cited

U.S. PATENT DOCUMENTS

| 3,210,553 | A  | * | 10/1965 | Cummings | F01D 25/22 |
| | | | | | 290/52 |
| 7,615,877 | B2 | * | 11/2009 | Willets | H02J 9/08 |
| | | | | | 307/64 |
| 7,766,077 | B2 | * | 8/2010 | Masters | F24D 17/0073 |
| | | | | | 210/600 |
| 2006/0053792 | A1 | * | 3/2006 | Bourgeois | C25B 1/04 |
| | | | | | 60/670 |
| 2010/0050638 | A1 | * | 3/2010 | Ogino | F01D 17/14 |
| | | | | | 60/670 |

* cited by examiner

*Primary Examiner* — Julio C. Gonzalez
(74) *Attorney, Agent, or Firm* — Baker, Donelson, Bearman, Caldwell & Berkowitz, P.C.; Edward D. Lanquist, Jr.; Dominic A. Rota

(57) ABSTRACT

A mobile power generation system includes a mobile platform upon which is coupled a turbine, an electric generator, a water boiler, and a liquid pump through a closed loop pipe. The water boiler is coupled to a source of flammable gas. The liquid pump is in fluid communication with a liquid discharge tank. The power generation system may also include a liquid supply tank in fluid communication with the discharge tank and an electronic controller that manages the operation of the system. The controller also includes a battery banked storage unit that runs through a battery inverted to change the power from DC current to AC current which runs the controller and pump.

10 Claims, 2 Drawing Sheets

MOBILE DIVERSIFIED POWER GENERATION SYSTEM UTILIZING GAS

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

FIELD OF THE INVENTION

The invention relates generally to power generation systems, and more particularly to a power generation system utilizing gas that is mobile.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Today, power generation systems may utilize a fluid to actuate a turbine coupled to an electric generator. This type of system may be incorporated into a large hydro-electric dam that uses the water to rotate the turbine. The use of a hydroelectric dam requires the power generation system to be stationary, extremely large, and extremely expensive.

Steam driven power generation systems may use a boiler to produce steam that is used to rotate the turbine. An extremely large amount of energy is required to produce the steam to operate these turbines. The required energy may be derived from the burning of coal or from a nuclear reactor. Both these types of power sources may be environmentally harmful and extremely expensive to operate. Furthermore, these types of power generation systems are very large and therefore again stationary in nature.

Therefore, there is a need for power generation system that may be mobile so that it may be scalable so that it may be used at a location that does not require a water source, a coal burning facility, or a nuclear reactor location. The device should be less expensive and simple to install and use, it should not require a large source of purchased energy to operate, and is better for the environment. It is to the provision of such therefore that the present invention is primarily directed.

BRIEF SUMMARY OF THE INVENTION

In a preferred form of the invention, a mobile power generation system comprises a mobile platform adapted for transportable from one geographic location to another geographic location. The mobile power generation system includes a turbine mounted or coupled to the mobile platform, an electric generator mounted or coupled to the turbine, a liquid boiler mounted or coupled to the mobile platform, the liquid boiler being in fluid communication with the turbine through a first pipe, the liquid boiler being couplable to a source of flammable gas, a liquid pump coupled to the mobile platform and in fluid communication with the liquid boiler through a second pipe, a liquid discharge tank coupled to the mobile platform and in fluid communication with the pump through a third pipe, the liquid discharge tank also being in fluid communication with the turbine through a fourth pipe, and a controller electrically coupled to the electric generator, the liquid boiler and the liquid pump. With this construction, the entire mobile power generation system may be moved from one geographic location to another geographic location.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF CERTAIN EMBODIMENTS

Figure 1:
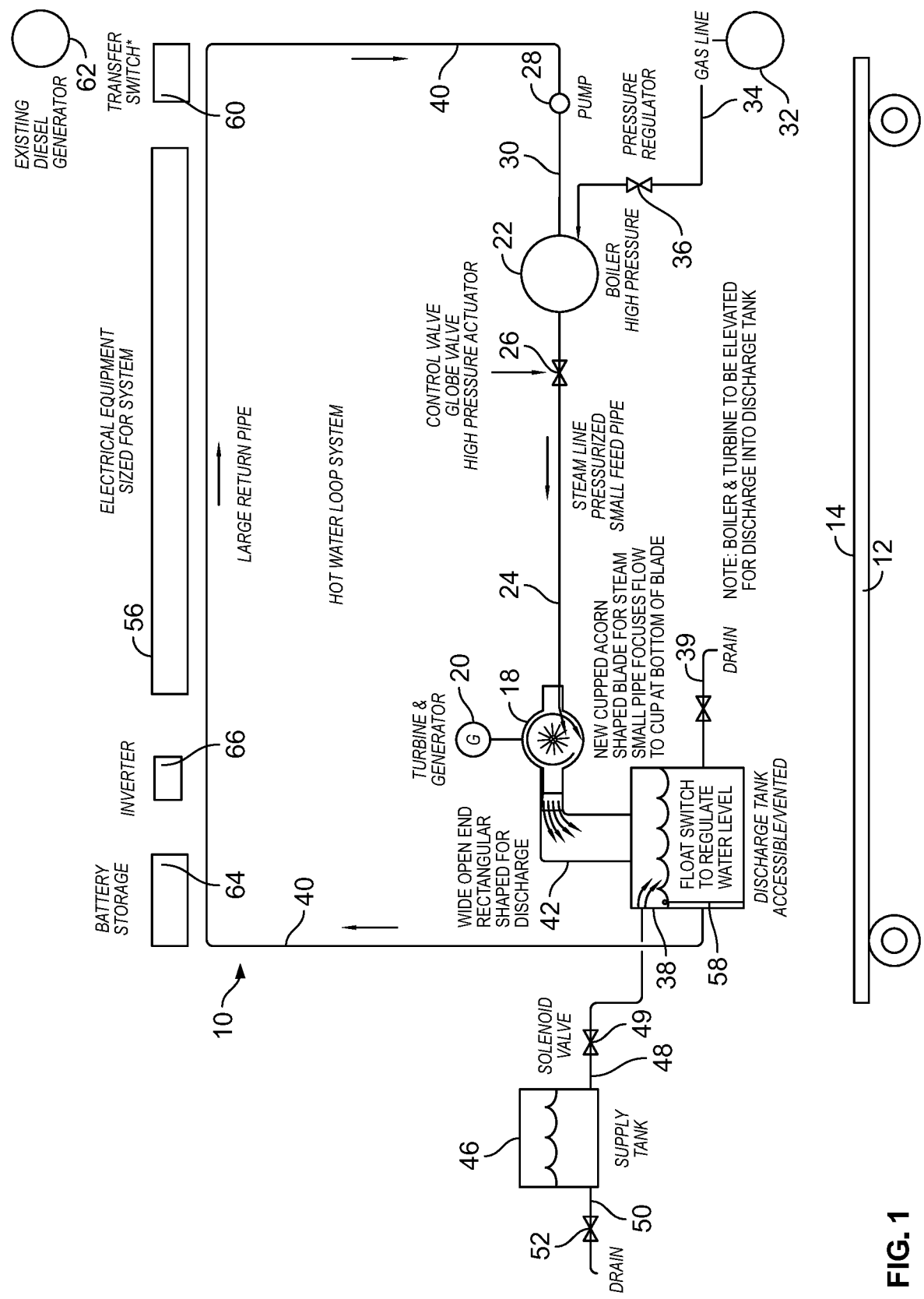
FIG. 1 is a schematic view of a mobile power generation system embodying principles of the invention in a preferred form.

With reference next to the drawings, there is shown a mobile power generation system 10 in a preferred form of the invention. In one form of the invention, the mobile power generation system 10 is utilized with a supply of flared or flammable gas, such as methane and/or flammable natural gas from an oil and gas production facility. Oil and gas production facilities oftentimes produce large amounts of waste flammable gases. These flammable gases are typically ignited and burned off at the facility site so that they are not released uncontrollably into the environment.

The mobile power generation system 10 includes a mobile platform 12, such as a wheeled trailer, skid platform, truck, truck bed, or the like. The mobile platform 12 has a generally flat support surface 14 which is configured to support industrial equipment. The term mobile, as used herein, is intended to mean that it is easily transported or moved from geographic location to geographic location with the use of a vehicle, trailer or the like, rather than a system that is constructed on-site and is not intended to ever be moved from that location.

The mobile power generation system 10 includes a turbine 18 that is coupled to an electric generator 20. The turbine 18 is in fluid communication with a liquid or water boiler 22 through a first conduit or pipe 24 having a control valve 26. The water boiler 22 is in fluid communication with a liquid pump 28 through a second conduit or pipe 30. The water boiler 22 is coupled to a source of flammable gas 32 through a gas line 34 having a pressure regulator or valve 36. The liquid pump 28 is in fluid communication with a liquid discharge tank 38 through a third conduit or pipe 40. The liquid discharge tank 38 is also in fluid communication with the turbine 18 through a fourth conduit or pipe 42. The liquid discharge tank 38 includes a valve controlled drain-pipe 39 The turbine 18, first pipe 24, water boiler 22, second pipe 30, liquid pump 28, third pipe 40, liquid discharge tank 38, and fourth pipe 42 form a closed loop for the circulation of fluid there though.

The mobile power generation system 10 may also include a liquid supply tank 46 in fluid communication with the discharge tank 38 so as to supply additional liquid to the discharge tank 38 through a fifth conduit or pipe 48. A solenoid valve 49 is coupled to the fifth pipe 48 to control the flow of liquid from the supply tank 46 to the discharge tank 38. The liquid supply tank 46 may also include a drain tube 50 controlled through a valve 52.

The mobile power generation system 10 also includes an electronic controller 56 that manages the operation of the generator 20, boiler 22, pressure regulator 36, and pump 29 through electronic signals sent by the components of the mobile power generation system 10 during its operation.

The turbine 18 may be similar to that shown in U.S. Pat. No. 9,739,255, which is incorporated herein by reference in its entirety. The turbine 18 may be modified to include thicker blades that are more cupped-shaped to allow maximum potential to capture the steam more efficiently and turn the turbine. The turbine 18 is made of a non-magnetic material such as Inconel or other nylon material rated for high pressure with a ceramic coating. The turbine is sized to match the size of the electric generator 20.

The electric generator 20 is preferably a permanent magnetic generator that is used because it arrives at full potential when it reaches approximately 300 rpms, for example, a Sunshine Power electric Machinery Company, Ltd, model number YGDLF-15. Such a generator may produce 120/240 V single phase, 120/208 V three phase, 277/480 V three phase, or larger voltage can be ordered to meet the needs of the consumer. The wattage associated with the generator can be 5 KW, 10 KW, 15 KW up to 1 Megawatt.

The discharge tank 38 is positioned below the level of the turbine 18 and generator 20 to allow the water from the steam to flow freely into the discharge tank 38. The discharge tank 38 is sized according to the size of the generator 20 and is formed from a material that can withstand high heat. The discharge tank 38 has a float switch 58 which communicates with the controller 56, or directly to the liquid supply tank 46, to operate the solenoid valve 49 to allow additional water to be supplied from the supply tank 46 to the discharge tank 38 through the fifth pipe 48. The float switch 58 has an automatic shut off activation when the desired level of water is reached within the discharge tank 38.

The supply tank 46 also has a float switch in electric communication with the controller 56 so as to indicate when the water within the supply tank 46 has reached a level that requires the operator to refill the supply tank 46 with water.

As an option, the controller 56 may include a transfer switch 60 to allow for a backup power supply through an existing diesel generator 62 located at the power generator site.

The controller 56 also includes a battery banked storage unit 64 that runs through a battery inverter 66 to change the power from DC current to AC current which runs the controller and pump.

The mobile power generation system's turbine, electric generator, liquid boiler, liquid pump, liquid discharge tank, and liquid supply tank are all fixedly mounted to mobile platform to prevent movement of these components.

In use, the mobile power generation system 10 is mobile or transportable meaning that it may be mobilized to any site enabling it to be used in remote areas that have no other electric power source. The mobile power generation system 10 may be coupled to an existing source of flammable gas so that the waste flammable gas is utilized to produce electricity rather than being wastefully burned off.

Once the mobile power generation system 10 is located at the site and coupled to the source of flammable gas 32, the supply tank 46 and discharge tank 38 are filled with water. The liquid pump 28 is then energized through controller 56 so that water within the discharge tank 38 flows through the third pipe 40, through pump 28, through the second pipe 30, and into the boiler 22.

The controller 56 then opens the pressure regulator 36 so that flammable gas may pass into the boiler 22. The flammable gas 32 is then ignited within the high pressure boiler 22 so as to heat the water to a temperature that creates a supply of steam. The controller 56 then opens the control valve 26 to allow steam to pass through the first pipe 24 and into the turbine 18, thereby causing the turbine 18 to rotate. The rotation of the turbine 18 in turn causes the actuation or operation of the electric generator 20, thereby producing electricity that may be supplied to sources outside the mobile power generation system 10.

The steam used to turn the turbine 18 is expelled from the turbine 18 through fourth pipe 42 and back into the discharge tank 38. The steam may be condensed within a condenser, within ancillary cooling pipes, or within the discharge tank depending upon the size of the system and its components. If the discharge tank 38 senses an inadequate supply of water therein through the float switch 58, the controller 56 opens solenoid valve 49 so that water passes from the supply tank 46 through firth pipe 48 and into the discharge tank 38 until an appropriate level of water is sensed.

The electricity produced by the operation of the electric generator 20 is controlled for use by the controller 56. Excess electricity may be utilized to recharge the battery bank storage unit 64.

Thus, it should be understood that the present mobile power generation system 10 produces electricity more efficiently by being capable of using waste flammable gas such as methane and natural gas. This mobile power generation system 10 may be scalable to meet a wide variety of consumers based on their electric needs and the amount of flammable gas accessible to it. The mobile power generation system 10 is diversified because each unit can be individually designed and sized to provide the desired amperage, wattage, and voltage in relationship to the company's needs and gas supply, thus aiding the environment and rendering the system commercially flexible for success.

Figure 2:
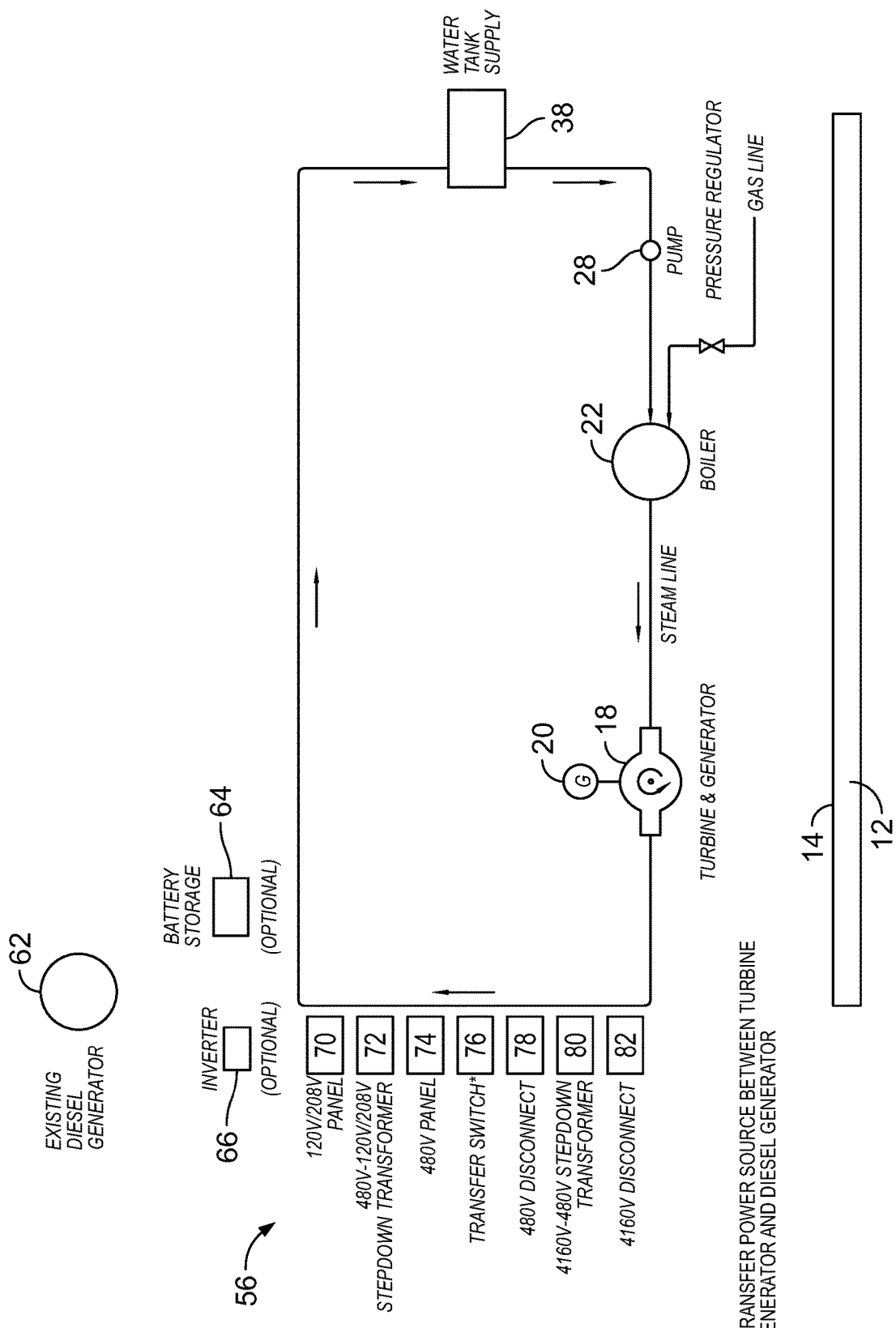
FIG. 2 is a schematic view of a mobile power generation system embodying principles of the invention in another preferred form.

With reference next to FIG. 2, there is shown an embodiment of the invention wherein the components are arranged in a slightly different configuration. The controller 56 is shown in more detail that includes a 120/208V panel, 70, a 480-120V/208V stepdown transformer 72, a 480V panel 74, a transfer switch 76, a 480V disconnect 78, a 4160-480 V stepdown transformer 80, and a 4160V disconnect 82.

Variations of the mobile power generation system are within the spirit of the claims. It will be appreciated that the inventions are susceptible to modification, variation, and change without departing from the spirit thereof. The foregoing embodiments are presented by way of example only; the scope of the present invention is to be limited only by the following claims.

The invention claimed is:
1. A mobile power generation system comprising:
a mobile platform transportable from one geographic location to another geographic location, such that the mobile platform is not permanently affixed onsite at either the one geographic location or the another geographic location;
a turbine coupled to said mobile platform;
an electric generator coupled to said turbine;
a liquid boiler coupled to said mobile platform, said liquid boiler being in fluid communication with said turbine through a first pipe, said liquid boiler being couplable to an existing source of waste flammable gas so that the waste flammable gas may be ignited and burned off at the source;
a liquid pump coupled to said mobile platform and in fluid communication with said liquid boiler through a second pipe;
a liquid discharge tank coupled to said mobile platform and in fluid communication with said pump through a third pipe, said liquid discharge tank also being in fluid communication with said turbine through a fourth pipe, wherein said turbine, said electric generator, said liquid boiler, said liquid pump, and said liquid discharge tank are fixedly mounted to said mobile platform; and
a controller electrically coupled to said electric generator, said liquid boiler, and said liquid pump, the controller configured to energize the liquid pump so that a liquid within said liquid discharge tank flows into said liquid boiler in a closed loop system formed by at least the first pipe, the second pipe, the third pipe, and the fourth pipe, wherein said controller includes a transfer switch couplable to an on-site backup generator.

2. The mobile power generation system of claim 1 wherein said mobile platform is a wheeled trailer or a slidable skid.

3. The mobile power generation system of claim 1 wherein said existing source of waste flammable gas constitutes an oil production facility or a gas production facility.

4. The mobile power generation system of claim 1 further comprising a liquid supply tank coupled to said mobile platform and in fluid communication with said discharge tank through a fifth pipe.

5. The mobile power generation system of claim 1 wherein said controller includes a battery storage.

6. A mobile power generation system comprising:
a mobile platform transportable from one geographic location to another geographic location, such that the mobile platform is not permanently affixed onsite at either the one geographic location or the another geographic location;
a turbine coupled to said mobile platform;
an electric generator coupled to said turbine;
a liquid boiler coupled to said mobile platform, said liquid boiler being couplable to a source of waste flammable gas, so that the waste flammable gas may be ignited and burned off at the source, said liquid boiler being in fluid communication with said turbine;
a liquid pump coupled to said mobile platform, said liquid pump being in fluid communication with said liquid boiler;
a liquid discharge tank coupled to said mobile platform, said liquid discharge tank being in fluid communication with said turbine, wherein said turbine, said electric generator, said liquid boiler, said liquid pump, and said liquid discharge tank are fixedly mounted to said mobile platform; and
a controller electrically coupled to said electric generator, said liquid boiler and said liquid pump, the controller configured to energize the liquid pump so that liquid within said liquid discharge tank flows into said liquid boiler in a closed loop, wherein said controller includes a transfer switch couplable to an on-site backup generator.

7. The mobile power generation system of claim 6 wherein said mobile platform is a wheeled trailer or a slidable skid.

8. The mobile power generation system of claim 6 wherein said existing source of waste flammable gas constitutes an oil production facility or a gas production facility.

9. The mobile power generation system of claim 6 further comprising a liquid supply tank coupled to said mobile platform, said liquid supply tank being in fluid communication with said discharge tank.

10. The mobile power generation system of claim 6 wherein said controller includes a battery storage.

* * * * *